United States Patent [19]

Williams

[11] Patent Number: 5,110,331
[45] Date of Patent: May 5, 1992

[54] DUST COLLECTOR WITH RE-ENTRAINMENT PREVENTION WALLS

[75] Inventor: Roger D. Williams, Dallas, N.C.

[73] Assignee: Pneumafil Corporation, Charlotte, N.C.

[21] Appl. No.: 691,347

[22] Filed: Apr. 25, 1991

[51] Int. Cl.⁵ .............................................. B01D 46/04
[52] U.S. Cl. ....................................... 55/302; 55/334; 55/337; 55/341.1
[58] Field of Search ................. 55/302, 337, 294, 334, 55/341.1

[56] References Cited

U.S. PATENT DOCUMENTS

| | | | |
|---|---|---|---|
| 1,743,934 | 11/1924 | Ruemelin | 55/341.2 |
| 3,541,764 | 11/1970 | Astrom | 55/302 |
| 3,648,442 | 3/1972 | Bourne | 55/294 |
| 4,218,227 | 8/1980 | Frey | 55/302 |
| 4,277,260 | 7/1981 | Browning | 55/273 |
| 4,395,269 | 7/1983 | Schuler | 55/302 |
| 4,655,799 | 4/1987 | Bosworth et al. | 55/273 |
| 4,680,038 | 7/1987 | Titus | 55/302 |
| 4,775,398 | 10/1988 | Howeth | 55/302 |
| 4,955,996 | 9/1990 | Edwards et al. | 55/302 |

FOREIGN PATENT DOCUMENTS 3709671 10/1988 Fed. Rep. of Germany ........ 55/302

Primary Examiner—Bernard Nozick
Attorney, Agent, or Firm—Shefte, Pinckney & Sawyer

[57] ABSTRACT

A dust collector for removing particles entrained and transported in a flow of transport air which comprises a housing having a generally cylindrical chamber with a tangential inlet for introducing the transport air and causing it to assume a helical flow path within the chamber. A plurality of vertically extending cylindrical filter elements are disposed within the chamber, and conventional reverse pulse-jets are provided for periodically cleaning the filter elements by creating a reverse flow of air outwardly therethrough. A wall arrangements is provided adjacent each filter element to create a flow channel that directs the outward flow cleaning air and particles removed from the filter elements thereby in a direction toward the main helical flow path of the transport air to substantially reduce re-entrainment of the removed particles.

18 Claims, 3 Drawing Sheets

DUST COLLECTOR WITH RE-ENTRAINMENT PREVENTION WALLS

BACKGROUND OF THE INVENTION

Dust collectors for use in removing various types of particulate matter and impurities entrained in or carried by a flow of transport fluid, such as air, have been known for some time, and when such dust collectors are intended for industrial use they will typically include a plurality of filter elements disposed in a dirty air chamber so that the transport air is caused to flow inwardly through filter elements so as to deposit the particulate matter on the exterior surface of filter elements and permit the cleaned air to be removed from the interior portion of the filter elements and discharged through a clean air chamber in the dust collector. The filter elements are usually fabric bags, as disclosed for example in U.S. Pat. No. 1,743,934, or cylindrically-shaped pleated paper filter elements as disclosed for example in U.S. Pat. Nos. 4,218,227, 4,395,269 and 4,277,260.

When dust collectors of this general type are used in industrial or commercial applications, there is usually a relatively high concentration of particulate matter in the transport air, and, therefore, this particulate matter tends to collect quickly on the exterior surface of the filter elements and prevent the flow of transport air therethrough, whereby the filter element will become incapable of carrying out its intended function unless the collected particles are periodically removed from the exterior surface of the filter element.

The typical method of removing such particles from the filter element is to periodically provide a reverse flow of cleaning air that is introduced at the interior of the filter means and caused to flow outwardly through the filter element in a direction opposite to the normal flow of the transport air, this reverse flow of cleaning air causing at least some of the particulate matter collected on the exterior surface of the filter elements to be moved away from the filter element so that the force of gravity will move the particulate matter downwardly, and ultimately reach the bottom portion of this dirty air chamber where they are collected in a hopper for periodic removal or, for example, they are sometimes removed continuously through an outlet by a vacuum or through a rotary valve. This reverse flow of cleaning air may take a variety of forms, but the most common form is to create at the interior of the filter element a brief, high pressure pulse of cleaning air that pulses each filter at periodic intervals, such as when the pressure drop across such filter element reaches a preset maximum value (e.g. two inches of water) as a result of the particulate matter collecting on the exterior surface of the filter element.

Since the normal inward flow of the transport air through the filter elements is only briefly interrupted by the reverse flow of the cleaning, many of the particles that are moved outwardly away from the surface of the filter element become re-entrained in the transport air when it resumes its normal flow through the filter element, and these re-entrained particles will be carried back to the surface of the filter element and again collected thereon. However, since such particles will be caused by gravity to move downwardly at least a short distance each time they are removed from and then brought back to the surface of the filter, they will gradually migrate downwardly along the surface of the filter element until they eventually reach the bottom portion thereof and fall by gravity to the bottom portion of the housing. While this gradual migration of at least some of the particles results in continuous ultimate removal of the particles from the surface of the filter elements, the relatively slow rate of such removal and the continuous re-entrainment of particles in the transport air imposes a heavy filtering load on the filter elements and thereby limits significantly the so-called air-to-cloth ratios (e.g. the ratio of the volume of transport air to the area of the filtering media presented by the filter elements). For example, in most industrial applications of dust collectors which utilize pleated cellulose paper filter elements having a high number of pleats per inch, the air-to-cloth ratio must be maintained at or below 3, and in many cases it cannot exceed 2. This limitation is quite significant because as the air-to-cloth ratio becomes smaller for any given application, the filtering equipment that must be provided for a given volume of transport air must be increased, thus increasing the capital and operating costs associated with the equipment as well as the floor space that must be dedicated to support the filtering equipment.

Additionally, it is economically desirable to position the filter elements in a dust collector as close to one another as possible so that a given size of dust collector will include as much filtering surface area as possible as discussed for example in U.S. Pat. No. 4,655,799. However, when the filter elements are located closely adjacent to one another, the problem of re-entrainment is exacerbated by the cross-contamination of some particles which are removed from the surface of one filter element and carried to the surface of an adjacent filter element. One proposal for dealing with the problem of cross-contamination of adjacent filter elements is disclosed in U.S. Pat. No. 4,775,398, wherein the generally square-shaped clean air chamber is provided with a plurality of partitions that divide the clean air chamber into four smaller chambers so that one filter element can be located in each of the smaller chambers to isolate each filter element therein and thereby prevent cross-contamination. While this arrangement does deal to some extent with the problem of cross-contamination, it appears to require a somewhat increased spacing between adjacent filter elements so as to increase the size of the dust collector unit, and, more importantly, it does not reduce re-entrainment problems at the surface of each individual filter element and may actually exacerbate this re-entrainment problem by requiring a closely confined chamber for each filter element that can cause more particles removed from such filter element to be re-entrained in the transport air flowing therethrough.

Finally, there are commercially available dust collectors that include a generally cylindrical chamber in which a plurality of vertically extending bag filters are located, each bag being provided with its own cleaning jet. The transport air is introduced into the chamber tangentially with respect to the curved inner wall thereof so that a helical flow path is established. In these dust collectors, a small portion of the particles removed form the exterior surfaces of the bags immediately adjacent the helical flow of the transport air may be reintroduced into such flow, but there is no process for dealing with re-entrainment at other portions of the filter bags, and there is no provision for dealing with cross-contamination of adjacent filter bags.

In accordance with the present invention, a dust collector is provided which significantly reduces both types of re-entrainment discussed above, and which increases significantly the air-to-cloth ratio relative to conventional dust collectors of this general type.

SUMMARY OF THE INVENTION

The dust collector of the present invention includes a housing having a generally cylindrical chamber, and an inlet for introducing the transport fluid, with entrained particles therein, into the chamber in a direction that causes the transport fluid to travel in a generally helical path along the interior surface of the chamber and in a direction toward a portion of the housing at which the removed dust particles are collected and/or discharged from the housing. Filter means extend within the chamber to permit the transport fluid to flow inwardly through the exterior surface of the filter means and cause the entrained particles to be removed from the transport fluid and collected on such exterior surface. A conventional filter cleaning arrangement is provided for periodically causing a reverse flow of cleaning fluid to flow back through the filter means in a direction opposite to the normal flow of the transport fluid for causing at least some of the collected particles on the filter means to be moved away from the exterior surface thereof. A wall is disposed within the chamber and arranged with respect to the filter means to create a flow channel between the wall and the exterior surface of the filter means that will cause at least some of the aforesaid reverse flow of cleaning fluid, and the particles removed from the filter means thereby, to flow in a direction toward the aforesaid helical flow path of the transport fluid, whereby such particles will be reintroduced into such helical flow path and carried toward the discharge or collection portion of the housing. Since many of the removed particles are recaptured by the downward helical movement of the transport air, they tend to move toward the collection or discharge portion of the housing rather than being immediately re-entrained in the portion of the transport fluid that is flowing toward and through the filter means.

In the preferred embodiment of the present invention, the filter means includes a plurality of filter elements having cylindrically shaped exterior surfaces, and the wall is spaced from the exterior surface of each filter element and has a corresponding curvature that forms an annular flow channel therebetween. Moreover, the filter elements are disposed within the chamber so that a first portion of the exterior surface of each filter element is located adjacent to and facing the helical flow path of the transport fluid so that particles removed from this first portion of the filter element by the cleaning fluid will be directed thereby toward and into such helical flow path, and the filter elements are disposed within the chamber so that a second portion of the exterior surfaces thereof face away from the helical flow path of the transport fluid, and the wall means is disposed in spaced relation to only this second portion of the exterior surface whereby particles removed therefrom by the cleaning fluid will be directed toward the helical flow path of the transport fluid by the flow created in the annular flow channel between the second portion of the filter surface and the wall. The plurality of filter elements are preferably arranged in a cluster within the confines of the helical flow path of the transport fluid, and the channel-forming walls also extend between adjacent filter elements to prevent, or at least significantly reduce, any cross contamination of removed particles from one filter element to another.

In one embodiment of the present invention, the cylindrical filter elements are arranged in the chamber with their axes extending parallel to one another and to the axis of the chamber, and with the axes of the filter elements lying in a circle having a common axis with the axis of the chamber. The respective end portions of each wall for each filter element extend in a direction generally radially toward the interior surface of the chamber and between adjacent filter elements. In another embodiment of the present invention, both of the end portions of each wall are curved away from an adjacent filter element and in a direction toward the direction of the flow in the helical flow path to cause the removed particles in the cleaning air to be guided toward such helical flow path in a direction generally tangential thereto.

DESCRIPTION OF THE PREFERRED EMBODIMENT

Figure 1:
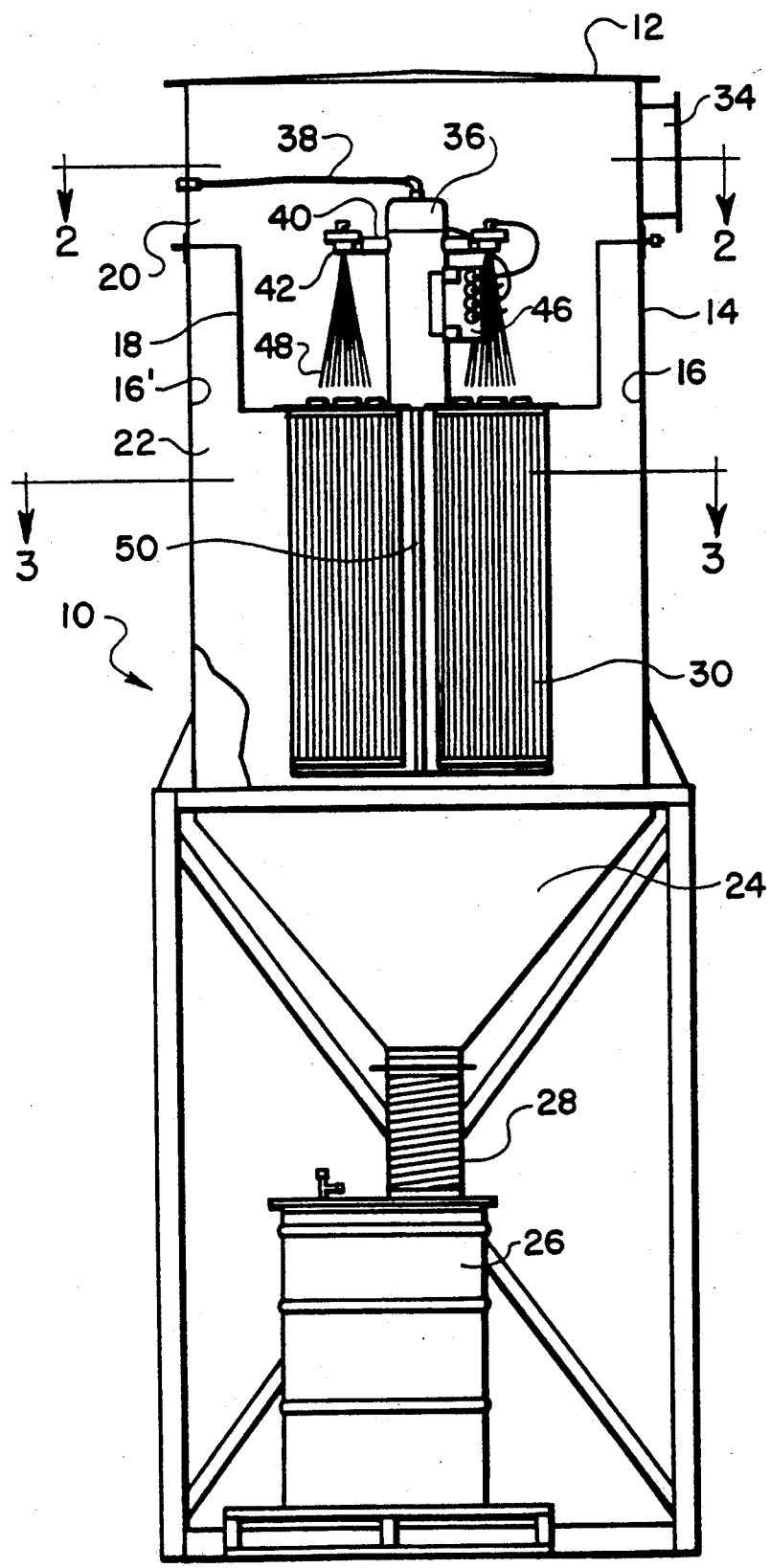
FIG. 1 is a side elevational view of a dust collector embodying the present invention.
Figure 2:
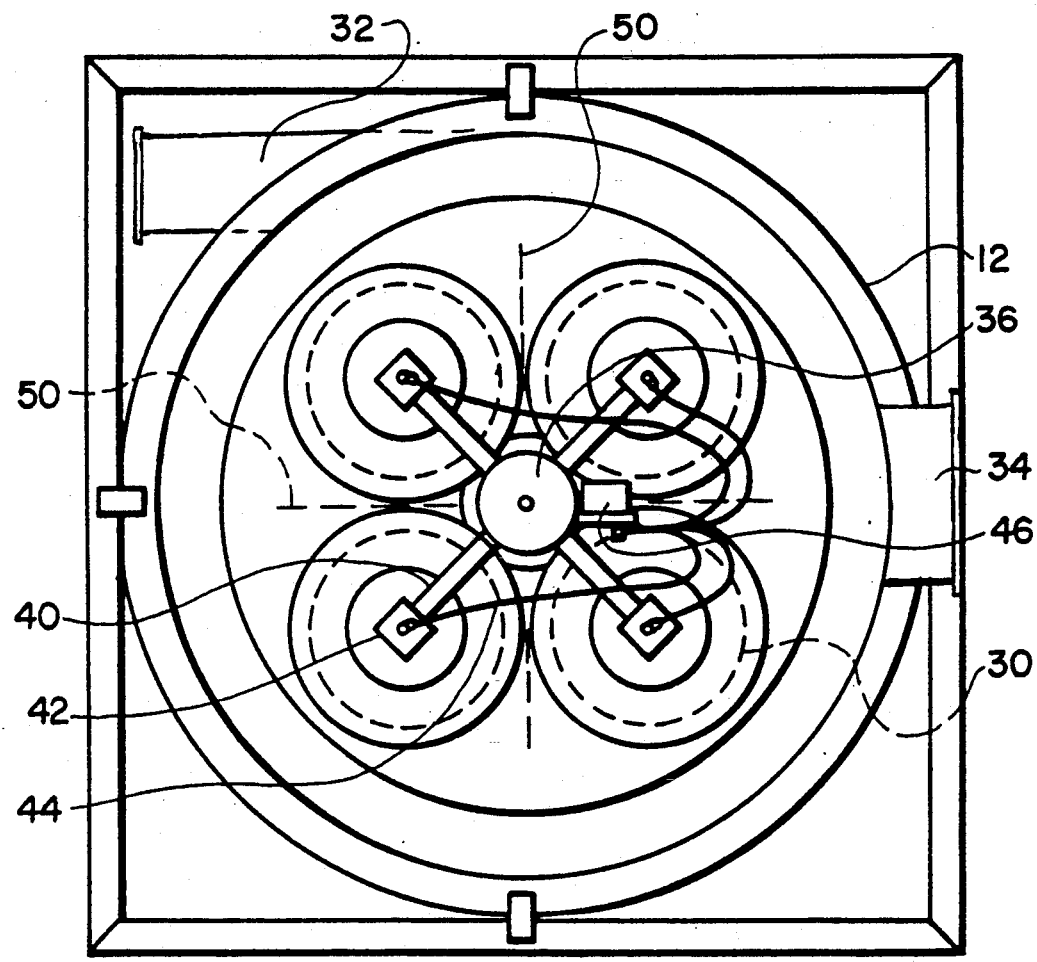
FIG. 2 is a sectional view taken along line 2—2 in FIG. 1.
Figure 3:
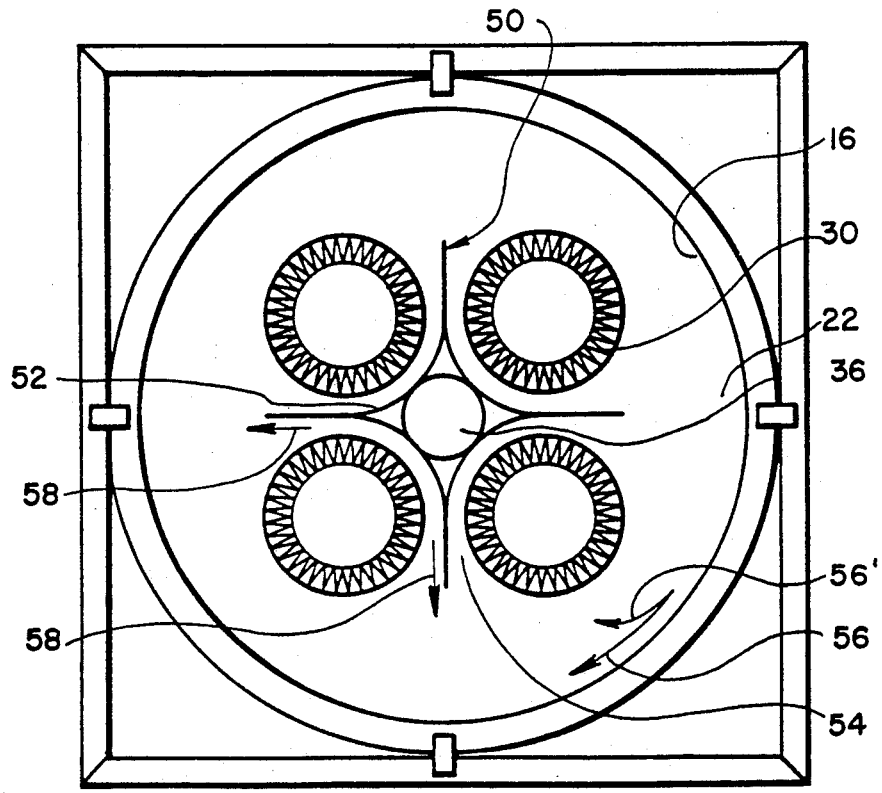
FIG. 3 is a sectional view taken along line 3—3 in FIG. 2.

Looking now in greater detail at the accompanying drawings, FIGS. 1-3 illustrate a dust collector 10 embodying the present invention for removing particles entrained and transported in a flow of transport fluid, usually air or the like. The dust collector 10 includes a housing 12 having a vertically extending and circular side wall 14 defining a generally cylindrical interior chamber 16 that is divided by a partition plate 18 into an upper clean air chamber portion 20 and a lower dirty air chamber portion 22, the partition plate 18 being formed with a vertical portion adjacent the inlet conduit 32 and spaced from the circular side wall 14 to form an annular chamber 16' adjacent the inlet conduit 32. The bottom of the housing 12 is an inverted cone which forms a hopper 24 for collecting dust removed from the air in a manner to be described presently. The dust which is collected and stored in the hopper 24 may be removed in any convention manner, such as by continuously discharging the dust into a drum 26 through a connecting conduit 28 as shown in FIG. 1, or, for example, by continuously removing the collected dust by use of a vacuum or through a rotary valve at the outlet of the hopper 24.

A plurality of filter elements 30 are mounted in the partition plate 18 to extend vertically therebelow and into the lower dirty air chamber 22. In the preferred embodiment of the present invention, the filter elements 30 are conventional cylindrically-shaped pleated paper filtering cartridges of the type frequently used in dust collectors, and they are arranged in the lower chamber 22 with their vertical axes extending parallel to one another and to the axis of the chamber 22. In the illustrated embodiment of the present invention, four filter elements 30 are used, and they are arranged in a cluster at the center of the chamber 22 with the vertical axes of the filter elements 30 lying in a circle having the same axis as the chamber 22. As best seen in FIGS. 1 and 2, a dirty air inlet conduit 32 extends directly into the lower chamber 22 in a tangential direction with respect to the interior wall of the lower dirty air chamber 22, and the housing 12 is provided with a clean air outlet conduit 34 that opens into the upper clean air chamber 20.

The dust collector 10 also includes a conventional pulse-jet cleaning system for periodically cleaning the filter elements 30 in a manner to be described in more detail presently. This cleaning system includes a reservoir tank 36 that is mounted at the center of the partition plate 18 to extend vertically with respect thereto, and a compressed air inlet conduit 38 extends from the exterior of the housing 12 to the reservoir tank 36 so that compressed air from any convenient source can be introduced into the reservoir tank 36 and maintained at a predetermined pressure. Four outlet conduits 40 extend radially from the reservoir tank 36 and support at the ends thereof conventional pulse-jet mechanisms 42 which are located directly above the center of each filter element 30, each of the pulse jets 42 being pneumatically operated in a predetermined sequence by air lines 44 extending from a control panel 46, all in a manner well known to those skilled in the art.

The dust collector 10 of the present invention may be used in a wide variety of industrial applications where particles of dust or foreign matter of various sorts are entrained and transported in a large volume of transport fluid, such as air. The dust collector 10 is located in such a system so that the transport air with the entrained particles therein is introduced into the housing inlet conduit 32 at a predetermined velocity, and this air ultimately passes through the filter elements 30 in a direction inwardly through the filtering medium so that the entrained particles are filtered from the air and collected on the exterior surfaces of the filter elements 30, and the cleaned air then flows from the interior portions of the filter elements 30 to the outlet chamber 20 and then back into the system through outlet conduit 34. As discussed above, the particles collect on the exterior surfaces of the filter elements 30, and as the particles accumulate they reduce the flow of air through the filter elements 30 and a pressure drop gradually builds up across the filtering media of the filtering elements 30. In many applications, the filter cleaning system is designed to clean the filter elements 30 when the pressure drop reaches a predetermined level (e.g. 2" of water), but it is also possible to program the system so that the filter elements 30 are cleaned at periodic timed intervals, or by using other criteria. In any event, depending on the control system that is employed, the control panel 46 will, at periodic intervals, send a control signal to the pulse jet 42 of each filter element 30, whereupon a valve is opened and a high pressure pulse of air is emitted from the jet as indicated diagrammatically by the lines 48 in FIG. 1, and into the central opening at the interior of the filter elements 30. This pulse of cleaning air passes outwardly through the filtering media in the filter elements 30 in a direction opposite to the normal inward flow of the transport air, and it causes at least some of the particles collected on the exterior surfaces of the filter elements 30 to be propagated outwardly from the surface of the filter elements 30. As described above, in known or conventional dust collectors, many of these particles are re-entrained in the transport air after the pulse of cleaning air has ceased, and they are brought back to the surface of the filter element 30, albeit at a somewhat lower position on the filter element 30 because of the influence of gravity on the particles, and the particles therefore gradually migrate to the bottom of the filter elements 30 and eventually fall into the hopper 24 for collection and/or discharge. While this gradual migration of particles downwardly along the surface of the filter elements 30 also takes place to some extent in the dust collector 10 of the present invention, the present invention also provides a unique arrangement for increasing significantly the re-entrainment of the particles into the transport air and accelerating the movement of such particles downwardly toward the hopper 24.

In accordance with an important feature of the present invention, and as best seen in FIGS. 2 and 3, the dust collector 10 includes a channel-forming wall arrangement 50 which is located generally at the center of the lower chamber 22 and adjacent each of the filter elements 30, this wall arrangement 50 extending vertically along the entire length of the filter elements 30. As best seen in FIGS. 2 and 3, the wall arrangement 50 includes a curved wall segment 52 adjacent to and spaced from that portion of the generally cylindrical exterior surface of the filter elements 30 which face away from the circular interior wall of lower chamber 22, thereby forming a flow channel 54 between that portion of each filter element 30 and its adjacent curved wall segment 52. It will be noted that each channel 54 is generally annular in shape, and the respective ends of each channel 54 face outwardly in a generally radial direction toward the interior surface of the lower chamber 22. It will also be noted that the curved wall segments 52 extend between adjacent filter elements 30 so as to provide a barrier to prevent cross contamination of adjacent filter elements 30 as will be described in greater detail below.

In operation, the transport air with entrained particles is introduced into the lower chamber 22 through the tangentially extending inlet conduit 32 at a predetermined velocity, and the combination of this tangential inlet, the circular interior wall of the lower chamber 22, and the velocity of the transport air causes the transport air and entrained particles to flow in a circular pattern along the cylindrical interior surface of the lower chamber 22. Moreover, since the relative negative pressure at the outlet conduit 34 is imposed along the entire vertical length of the filter elements 30, the aforesaid generally circular flow pattern of the transport air and entrained particles is formed into a generally helical flow path along the interior surface of the inner chamber 22 which gradually moves downwardly toward the hopper 24, with portions of the transport air and the entrained particles therein being gradually drawn inwardly toward and through the filter elements 30. The confines of the annular chamber portion 16, above the filter elements 30 and adjacent the inlet conduit 32 assist in initially forming the transport air and entrained particles into the desired helical flow path. The mass of the particles entrained in the transport air will cause these particles to follow this same helical flow path, and, indeed, in many applications the mass of the particles is such that many of them will be carried directly to the hopper 24 by the helical flow path without ever being drawn to the filter elements 30. At least some, and in many applications most, of the lighter particles are drawn away from the helical flow path with the transport air toward the filter elements 30 with the transport air passing through the filter elements and depositing the particles on the exterior surface of the filter elements 30. In FIG. 3, the helical flow path is indicated generally by the reference numeral 56, and the reference numeral 56' indicates generally the flow of the transport air and the entrained particles toward the filter elements 30.

As described above, each of the pulse jets 48 are "fired" at periodic intervals to eject a pulse of cleaning air into the interior portion of the filter elements 30, thereby causing a flow of cleaning air back through the exterior surface of the filter elements in a direction opposite to the normal inward flow of the transport air. This outward flow of cleaning air acts to move at least some of the particles collected on the exterior surface of the filter elements 30 away from the exterior surface. In the present invention, the area of the channel 54 is designed to confine and direct this outward flow of cleaning air so that it must flow along the channel 54 and outwardly from the open ends thereof toward the helical flow path 56, this outward flow being indicated generally by the reference numeral 58. By virtue of this directed flow path of the cleaning air, many of the particles removed from the surface of the filter elements 30 by the pulse of cleaning air are carried along with this directed flow of the cleaning air and they are reintroduced into the downwardly directed helical flow path 56 from both ends of each channel 54. Consequently, these particles are not immediately re-entrained in the transport air and almost immediately redeposited on the surface of the filter elements in the manner described above in connection with convention dust collectors. Rather, these particles are more rapidly carried by the helical flow path 56 toward the hopper 24, and while some or all of these particles may at some point flow back to the surface of the filter elements 30, this will occur at a point on the filter element 30 that is significantly below the point at which the particle was removed as compared with the gradual migration of re-entrained particles in conventional dust collectors. Also, it will be noted that the ends of each curved wall segment 52 extend outwardly with a sufficient extent that they will provide a barrier between adjacent filter elements 30 whereby the particles removed by the reverse flow of cleaning air will not flow directly onto the exterior surface of an adjacent filter element 30. Finally, it will be noted that each of the curved wall segments 52 surround approximately one half of the exterior cylindrical surface of its adjacent filter element 30, this one-half portion of the filter element 30 being that portion that faces away from the interior surface of the lower chamber 22. The other one-half portion of the filter element 30 is disposed in facing relation to the interior surface of the chamber 22 and adjacent to the helical flow path 56 so that the flow of cleaning air outwardly through the front facing one-half of the filter elements will cause particles removed thereby to be introduced directly into the helical flow path 56, this movement of particles being assisted at least to some extent by the flow of cleaning air generated by the air exiting from the ends of the channel 54. The downward flow of the dust particles in the dust collector 10 is also improved by the fact that the upper end of the wall arrangement 50 is attached directly to the partition plate 18 so that the upper end of the channels 54 is closed by the partition plate 18, but the lower end of the channels 54 at the bottom of each filter element 30 is open and, accordingly, a portion of the reverse flow of the cleaning air is directed vertically downwardly from the bottom of the channels 54 towards the hopper 24 and any particles in that reverse flow of air will be carried directly into the hopper 24.

Figure 4:
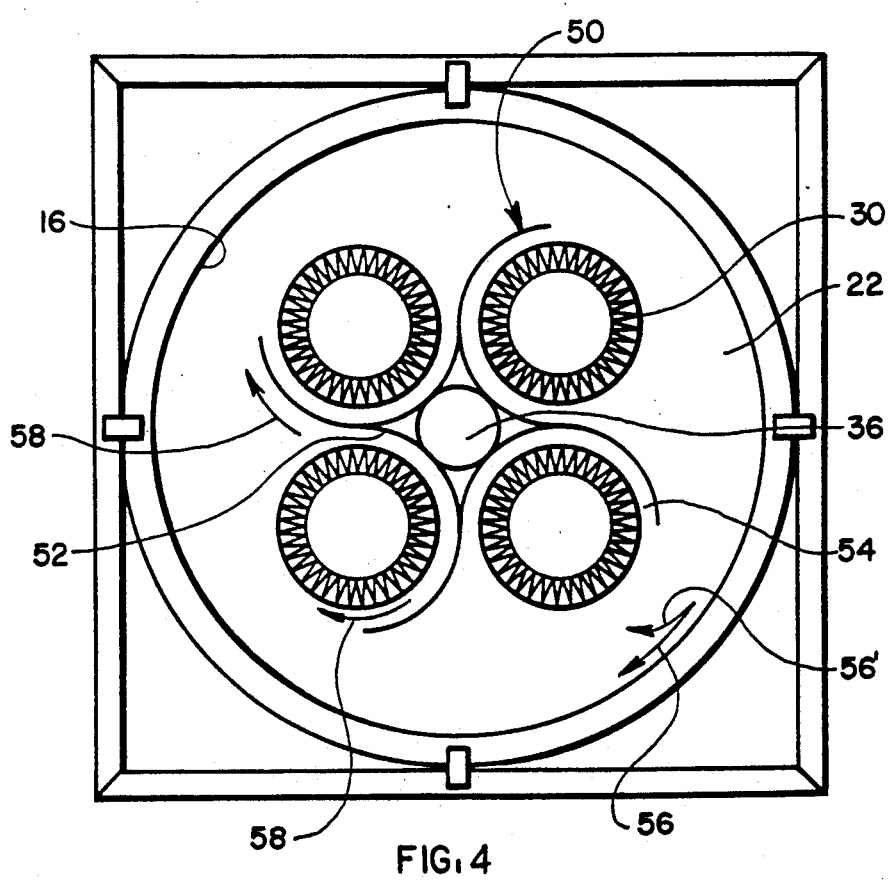
FIG. 4 is a sectional view similar to FIG. 3, but showing an alternate embodiment of the present invention.

While the embodiment of the present invention that is illustrated in FIGS. 1-3 includes four filter elements 30, it will be readily apparent that other numbers and configurations of filter elements can also be used within the scope of the present invention. Also, while the generally annular configuration of the channels 54 is preferred, other configurations of these flow channels can also be used in different applications, provided only that these flow channels result in a properly directed flow of the cleaning air that will move the particles away from the filter elements and into the main flow path of the transport air. For example, FIG. 4 illustrates one alternate embodiment of the configuration of the channel 54. In this embodiment, the helical flow path is in a clockwise direction as indicated by arrow 56, and each end of the channel 54, rather than being radially directed as in the embodiment of FIG. 3, is curved generally in a direction toward the clockwise helical flow path so that the cleaning air directed outwardly from the ends of the channels 54 is reintroduced into the helical flow path 56 in a direction generally tangential with respect thereto so that the particles in the cleaning air will be smoothly reintroduced into the helical flow path 56.

It will be apparent to those skilled in the art that the dust collector 10 of the present invention substantially reduces the problem of re-entrainment by more rapidly and more efficiently separating the particles from the transport air and moving them more directly and more quickly to the collection hopper 24. As a direct consequence of this improvement, the efficiency of the dust collector 10 is markedly increased to such an extent that the above-discussed air-to-cloth ratio can be significantly increased. Accordingly, as compared with conventional dust collectors of this type, a much smaller dust collector, with a smaller number of filter elements 30, can be used to effectively clean a given volume of transport air, thereby reducing substantially the capital cost involved in purchasing a dust collector, and also reducing the operating expense of the smaller dust collector and the floor space occupied by the dust collector.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A dust collector for removing particles entrained and transported in a flow of a transport fluid, said dust collector comprising:

(a) a housing having a generally cylindrical chamber, inlet means for introducing said transport fluid into said chamber in a generally helical flow path along the interior surfaces of said chamber and in a direction toward a portion of said housing at which removed dust particles are collected or discharged from the housing and outlet means through which said transport fluid exits said housing;

(b) filter means mounted in said housing and extending within said chamber and formed with a filter material to permit said transport fluid to flow inwardly through the exterior surface of said filter means and cause said particles to be removed from said transport fluid and collected on said exterior surface;

(c) filter cleaning means mounted in said housing for periodically causing a reverse flow of cleaning fluid to flow back through said filter means in a direction opposite to the normal flow of said transport fluid for causing at least some of the collected particles on said filter means to be moved away from said exterior surface thereof; and (d) wall means disposed within said chamber and partially surrounding said filter means to define a flow channel between said wall means and said exterior surface of said filter means that will cause at least some of said reverse flow of cleaning fluid and said particles removed from said filter means thereby to flow in a direction toward and directly into said generally helical flow path of said transport fluid and to cause said particles to be reintroduced into said helical flow path of said transport fluid and carried toward said discharge collection portion of said housing by said flow path.

2. A dust collector as defined in claim 1, wherein said filter means includes at least two filter elements, each having a cylindrically shaped exterior surface and said wall means is formed with a curvature and is spaced from said filter element exterior surface to form an annular flow channel therebetween.

3. A dust collector as defined in claim 2, wherein each said filter element is disposed within said chamber so that a first portion of said exterior surface thereof is located adjacent to and facing said helical flow path of said transport fluid so that said particles removed from said first portion by said cleaning fluid will be directed thereby toward and into said helical flow path and so that a second portion of said exterior surface faces away from said helical flow path, and wherein said wall means is disposed in spaced relation to only said second portion of said exterior surface.

4. A dust collector as defined in claim 1, and wherein said wall means is located between each of said filter elements to prevent dust particles removed from one of said filter elements by said cleaning fluid from flowing to the exterior surface of an adjacent filter element.

5. A dust collector as defined in claim 4, wherein each of said filter elements is generally cylindrical in shape, and said plurality of filter elements are arranged in a cluster within the confines of said interior surface of said chamber and with the axes of said filter elements extending generally parallel to the axis of said chamber.

6. A dust collector as defined in claim 5, wherein said wall means includes a curved wall portion spaced from the said exterior surface of each said filter element in said cluster to form said flow channel therewith, each said curved wall portion having a radius of curvature formed about said axes of an adjacent filter element whereby said flow channel is generally annular in shape.

7. A dust collector as defined in claim 6, wherein said axes of said filter elements lie in a circle having a common axis with the axis of the interior surface of said cylindrical chamber and with the axis of said helical flow path of said transport fluid.

8. A dust collector as defined in claim 6, wherein a first portion of the exterior surface of each said filter element is disposed adjacent to and facing said helical flow path of said transport fluid so that said particles removed from said first portion of each said filter element by said cleaning fluid will be directed thereby toward said helical flow path, wherein a second portion of said exterior surface of each said filter element faces away from said helical flow path, and wherein said curved wall portion of said wall means is disposed in spaced relation to said second portion of each said filter element and between adjacent filter elements.

9. A dust collector as defined in claim 6, wherein the respective end portions of said wall means extend in a direction generally radially toward the interior surface of said chamber.

10. A dust collector as defined in claim 6, wherein at least one end portion of said wall means is curved away from an adjacent filter element and in a direction toward the flow of the transport fluid in said helical path for causing said removed particles to be guided toward said helical flow path in a direction generally tangential with respect thereto.

11. A dust collector for removing particles entrained and transported in a flow of transport fluid, said dust collector comprising:

(a) a housing having a generally cylindrical chamber, inlet means for introducing said transport fluid into said chamber in a direction to cause said transport fluid to travel in a generally helical flow path along the interior surface of said chamber and in a direction toward a portion of said housing at which removed dust particles are collected or discharged from said housing, and outlet means through which said transport fluid exits said housing;

(b) a plurality of generally cylindrical filter elements mounted in said housing and extending within said chamber with their axes generally parallel to the axis of said chamber and being formed of a filter material to permit said transport fluid to flow inwardly through the exterior surface of said filter elements and cause said particles to be removed from said transport fluid and collected on said exterior surface, said filter elements being arranged within said chamber in a cluster with each said filter having a first exterior surface portion facing said interior surface of said chamber and having a second exterior surface portion facing away from said interior surface of said chamber;

(c) filter cleaning means mounted in said housing for periodically causing a reverse flow of cleaning fluid to flow back through said filter elements in a direction opposite to the normal flow of said transport fluid for causing at least some of the collected particles on said filter elements to be moved away from said exterior surfaces thereof; and (d) wall means disposed within said chamber between said filter elements, and said wall means being located with respect to said second exterior surface portion of each said filter element to create therewith a flow channel that causes said reverse flow of cleaning fluid passing through said second interior surface portion and said particles removed from said filter element thereby to flow in a direction toward said generally helical flow path of said transport fluid, whereby said particles will be reintroduced into said transport fluid and carried toward said discharge or collection portion of said housing.

12. A dust collector as defined in claim 11, wherein said wall means includes a curved wall portion disposed in spaced, coaxial relation to said second surface portion of each said filter element, so a to form said flow channel as an annular channel having the respective ends thereof disposed to direct said cleaning fluid in a direction toward said helical flow path.

13. A dust collector as defined in claim 12, wherein each said curved wall portion extends between adjacent ones of said filter elements to prevent particles removed from said exterior surfaces of the filter element moving to said exterior surface of an adjacent filter element.

14. A dust collector for removing particles entrained and transported in a flow of a transport fluid, said dust collector comprising:
    (a) a housing having a generally hollow chamber, inlet means for introducing said transport fluid into said chamber in a direction to cause said transport fluid to travel in a generally downward flow path along the interior surfaces of said chamber and in a direction toward a portion of said housing at which removed dust particles are collected or discharged from the housing, and outlet means through which said transport fluid exits said housing;
    (b) filter means mounted in said housing and extending within said chamber and formed with a filter material to permit said transport fluid to flow inwardly through the exterior surface of said filter means and cause said particles to be removed from said transport fluid and collected on said exterior surface;
    (c) filter cleaning means mounted in said housing for periodically causing a reverse flow of cleaning fluid to flow back through said filter means in a direction opposite to the normal flow of said transport fluid for causing at least some of the collected particles on said filter means to be moved away from said exterior surface thereof; and
    (d) wall means disposed within said chamber at a spacing from the housing and partially surrounding said filter means to define a flow channel between said wall means and said exterior surface of said filter means that will cause at least some of said reverse flow of cleaning fluid and said particles removed from said filter means thereby to flow toward and directly into said generally downwardly flow path of said transport fluid and to cause said particles to be reintroduced into said helical flow path of said transport fluid and carried toward said discharge collection portion of said housing by said flow path.

15. A dust collector as defined in claim 14, wherein said filter means includes at least two filter elements, each having a cylindrically shaped exterior surface and said wall means is formed with a curvature and is spaced from said filter element exterior surface to form an annular flow channel therebetween.

16. A dust collector as defined in claim 15, wherein each said filter element is disposed within said chamber so that a first portion of said exterior surface thereof is located adjacent to and facing said downward flow path of said transport fluid so that said particles removed from said first portion by said cleaning fluid will be directed thereby toward and into said downward flow path and so that a second portion of said exterior surface faces away from said downward flow path, and wherein said wall means is disposed in spaced relation to only said second portion of said exterior surface.

17. A dust collector for removing particles entrained and transported in a flow of a transport fluid, said dust collector comprising:
    (a) a housing having a generally hollow chamber, inlet means for introducing said transport fluid into said chamber in a direction to cause said transport fluid to travel in a generally downward flow path along the interior surfaces of said chamber and in a direction toward a portion of said housing at which removed dust particles are collected or discharged from the housing, and outlet means through which said transport fluid exits said housing;
    (b) filter means mounted in said housing and extending within said chamber and formed with a filter material to permit said transport fluid to flow inwardly through the exterior surface of said filter means and cause said particles to be removed from said transport fluid and collected on said exterior surface, said filter means comprising a plurality of filter elements;
    (c) filter cleaning means mounted in said housing for periodically causing a reverse flow of cleaning fluid to flow back through said filter means in a direction opposite to the normal flow of said transport fluid for causing at least some of the collected particles on said filter means to be moved away from said exterior surface thereof; and
    (d) wall means disposed within said chamber and arranged with respect to said filter means to create a flow channel between said wall means and said exterior surface of said filter means that will cause at least some of said reverse flow of cleaning fluid and said particles removed from said filter means thereby to flow in a direction toward said generally downwardly flow path of said transport fluid, whereby said particles be reintroduced into said downward flow path of said transport fluid and carried toward said discharge collection portion of said housing, said wall means being located between each of said filter elements to prevent dust particles removed from one of said filter elements by said cleaning fluid from flowing to the exterior surface of an adjacent filter element.

18. A dust collector for removing particles entrained and transported in a flow of transport fluid, said dust collector comprising:
    (a) a housing having a chamber, inlet means for introducing said transport fluid into said chamber in a direction to cause said transport fluid to travel in a flow path within the interior of said chamber and in a direction toward a portion of said housing at which removed dust particles are collected or discharged from said housing, and outlet means through which said transport fluid exits said housing;
    (b) a plurality of generally cylindrical filter elements mounted in said housing and extending within said chamber with their axes generally parallel to one another and being formed of a filter material to permit said transport fluid to flow inwardly through the exterior surface of said filter elements and cause said particles to be removed from said transport fluid and collected on said exterior surface, said filter elements being arranged within said chamber in a cluster with each said filter having a first exterior surface portion facing said interior surface of said chamber and having a second exterior surface portion facing away from said flow path within said chamber;

(c) filter cleaning means mounted in said housing for periodically causing a reverse flow of cleaning fluid to flow back through said filter elements in a direction opposite to the normal flow of said transport fluid for causing at least some of the collected particles on said filter elements to be moved away from said exterior surfaces thereof; and (d) wall means disposed within said chamber between said filter elements, and said wall means being located with respect to said second exterior surface portion of each said filter element to create therewith a flow channel that causes said reverse flow of cleaning fluid passing through said second interior surface portion and said particles removed from said filter element thereby to flow in a direction toward said flow path of said transport fluid, whereby said particles will be reintroduced into said transport fluid and carried toward said discharge or collection portion of said housing.

* * * * *